United States Patent [19]

Wieczorek et al.

[11] Patent Number: 5,150,361
[45] Date of Patent: Sep. 22, 1992

[54] ENERGY SAVING PROTOCOL FOR A TDM RADIO

[75] Inventors: Alfred B. Wieczorek, Plantation, Fla.; Alvin D. Kluesing, San Diego, Calif.; Michael D. Sasuta, Mundelein, Ill.

[73] Assignee: Motorola, Inc., Schaumburg, Ill.

[21] Appl. No.: 644,368

[22] Filed: Jan. 18, 1991

Related U.S. Application Data

[63] Continuation-in-part of Ser. No. 300,992, Jan. 23, 1989, abandoned.

[51] Int. Cl.⁵ .......................... H04B 1/16; G08B 5/22
[52] U.S. Cl. .............................. 370/95.1; 340/825.44; 455/343
[58] Field of Search .................. 370/24, 29, 50, 70, 370/77, 95.1, 95.2, 95.3, 110.1; 455/7, 8, 9, 38, 67, 68, 70, 343, 32, 34, 58; 340/825.44, 825.47, 825.52

[56] References Cited

U.S. PATENT DOCUMENTS

| | | | |
|---|---|---|---|
| 4,181,893 | 1/1980 | Ehmke | 325/492 |
| 4,427,980 | 1/1984 | Fennell et al. | 340/825.52 |
| 4,431,991 | 2/1984 | Bailey et al. | 340/825.52 |
| 4,449,248 | 5/1984 | Leslie et al. | 455/343 |
| 4,509,199 | 4/1985 | Ichihara | 455/7 |
| 4,518,961 | 5/1985 | Davis et al. | 340/825.44 |
| 4,577,315 | 3/1986 | Otsuka | 370/95 |
| 4,668,949 | 5/1987 | Akahori et al. | 340/825.47 |
| 4,736,461 | 4/1988 | Kawasaki et al. | 455/343 |
| 4,777,633 | 10/1988 | Fletcher et al. | 370/50 |
| 4,794,649 | 12/1988 | Fujiwara | 455/343 |
| 4,839,639 | 6/1989 | Sato et al. | 340/825.44 |
| 4,995,099 | 2/1991 | Davis | 455/343 |
| 4,996,526 | 2/1991 | DeLuca | 455/343 |

FOREIGN PATENT DOCUMENTS 60-223339A 11/1985 Japan .
62-271589A 11/1987 Japan .

OTHER PUBLICATIONS

"Digital Display Radio Paging System" by Koichi Nagata et al., NEC R&D, No. 68, Jan. 1983, pp. 18-23.
"Nationwide Radio Paging System" by Takakuni Kuki et al., NEC R&D, No. 68, Jan. 1983, pp. 7-15.
"A Standard Code for Radiopaging" British Telecom, TD4.2.3., 1978-1979, pp. 1-40.
"Standard Message Formats for Digital Radiopaging," Post Office Code Standardization, British Telecom, ME/BS5.2., Autumn 1980, pp. 1-49.
"Selective Signaling for Portable Applications" by Leonard E. Nelson, IEEE Vehicular Technology Conference, Mar. 22-24, 1978, pp. 178-188.

*Primary Examiner*—Douglas W. Olms
*Assistant Examiner*—Alpus H. Hsu
*Attorney, Agent, or Firm*—Robert S. Babayi

[57] ABSTRACT

A battery powered TDM (or combined TDM/FDM) communication device (104, 105) operates within a TDM communication system (100) having a communication channel arranged into repetitive time frames (401) each having a plurality of slots. At least two of these slots (404) are allocated for communicating signalling and control information. To conserve energy, the battery powered communication device operates in a first mode (i.e., the energy saving mode) to shut down non-essential circuits for a predetermined time interval, awaking to monitor only one of the two control slots. In this way signalling and control information may be received. When not operating in the energy saving mode, the battery powered communication device operates in a second mode (i.e., a fast access mode) to monitor both of the control slots (404).

24 Claims, 3 Drawing Sheets

SYNC = 1.25 MSEC.
10SP = 10.86 MSEC.
SLOT ID = 0.31 MSEC.

SYNC = 5.0 MSEC.
RESERVED = 2.81 MSEC.

ENERGY SAVING PROTOCOL FOR A TDM RADIO

CROSS REFERENCE TO RELATED APPLICATIONS

This application is a continuation-in-part of U.S. patent application Ser. No. 300,992, filed Jan. 23, 1989, assigned to Motorola, Inc. and now abandoned.

TECHNICAL FIELD of the INVENTION

This invention relates generally to radio frequency communication systems, and more specifically to battery powered radios capable of operating in such systems, and is particularly directed toward a protocol for managing energy consumption in battery powered radios thereby prolonging operation within a time division multiplex (TDM) (or combined TDM/FDM) radio frequency communication system.

BACKGROUND of the INVENTION

Broadly stated, the goal of any energy saving system is to prolong the functional life of a device without degrading or disrupting the device's proper operation. To do this, the lifetime of the device's energy source (i.e., the battery) must be extended. Several energy saving techniques designed to accomplish battery life extension are known. The most widely known techniques involve the "Battery Savers" commonly used in the paging receiver arts. Typical of these battery saving techniques are methods to temporarily inactivate selected circuits during periods of non-activity. In more advanced battery savers, it is also known to reduce the operational speed (i.e., clock rate) of microprocessors and other digital circuits. In this way the discharge rate of the battery is reduced thereby extending the pager's operational life between battery replacement or recharge.

The difficulty in extending the paging battery saving techniques to other applications arise fundamentally from the differences between a paging system and, for example, a two-way communication system. Paging systems operate in non-real time. That is, a message (or data) to be forwarded to page an individual is first recorded (or stored), and later played back (transmitted) when the pager has been awaken from a "sleeping" mode (i.e., the battery saver mode). Thus, a paging system provides essentially time delayed one-way communication in a communication system having only a rare need to effect system operational parameter changes, and a system that need not be concerned with access time, channel loading, or channel resource distribution.

Conversely, access time, channel loading, and channel resource distribution are initial and primarily concerns of two-way communication systems. Additionally, system operational parameter changes, channel grants, emergency calls, variation in talk-group affiliations, and the like must be rapidly effected throughout a two-way communication system to maintain the organization of the subscribers operating within the system, and of the system itself. The real-time nature of communication in a two-way system complicates the process since messages cannot simply be stored until transmission is convenient for the communication system.

SUMMARY of the INVENTION

Accordingly, it is an object of the present invention to provide an energy saving technique for use in a TDM (or combined TDM/FDM) communication system that overcomes the deficiencies of the prior art.

Briefly, according to the invention, a battery powered TDM (or combined TDM/FDM) communication device operates within a TDM communication system having a communication channel arranged into repetitive time frames each having a plurality of slots. At least two of these slots are allocated for communicating signalling and control information. To conserve energy, the battery powered communication device operates in a first mode (i.e., the energy saving mode) to shut down non-essential circuits for a predetermined time interval, awaking to monitor one of the two control slots. In this way signalling and control information may be received. When not operating in the energy saving mode, the battery powered communication device operates in a second mode (i.e., a fast access mode) in which each of the at least two control slots are monitored.

DESCRIPTION of the PREFERRED EMBODIMENT

Figure 1:
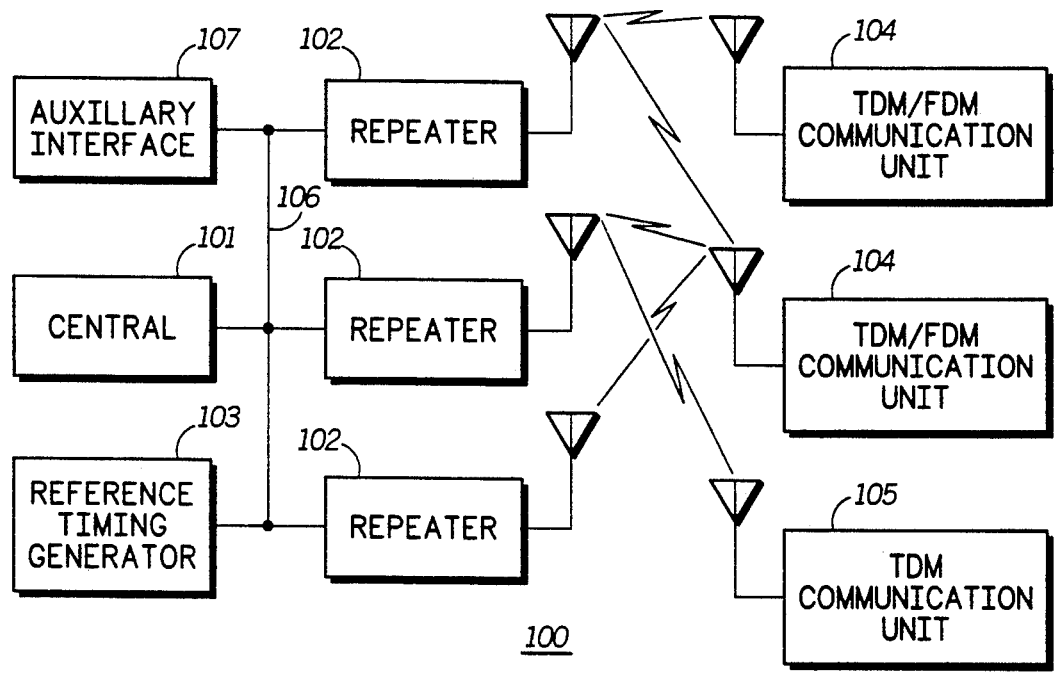
FIG. 1 is a block diagram of a communication system according to the invention.

Referring to FIG. 1, a time division multiplexed (TDM) communication system implementing the invention can be seen as generally depicted by the numeral 100. The system 100 includes generally a central controller 101, that controls the allocation of communication channels (frequencies and time slots) to promote organized communication between various communication units. The central controller 101 connects via known interconnections with a plurality of repeaters 102; there being one repeater 102 for each supported frequency (or frequency pair, depending upon the application). The central controller 101, controls the operation of the repeaters 102 and provides control channel information. Each repeater 102 may include a microprocessor and associated digital circuitry, in which case the controlling actions of the central controller 101 may take the form of data packets transferred over an interconnecting network 106.

The system also includes a reference timing generator 103, and one or more auxiliary interface units 107. The timing generator 103, which may include a high stability reference oscillator, provides various clock signals, including but not limited to a TDM frame clock, slot clock, and data symbol clock, to the central controller 101 and the repeaters 102 to maintain time synchronization throughout the system. The auxiliary interfaces 107 provide means to interconnect the system 100 with non-radio frequency (RF) communication units, such as conventional telephone lines and dispatch consoles.

The system also includes a plurality of communication units, including TDM/FDM capable units 104 and TDM only communication units 105. (As used herein, "communication unit" is intended to refer to any of a variety of radio platforms, including but not limited to mobile radios, portable radios, and fixed location radios, including both one-way and two-way devices).

Figure 2:
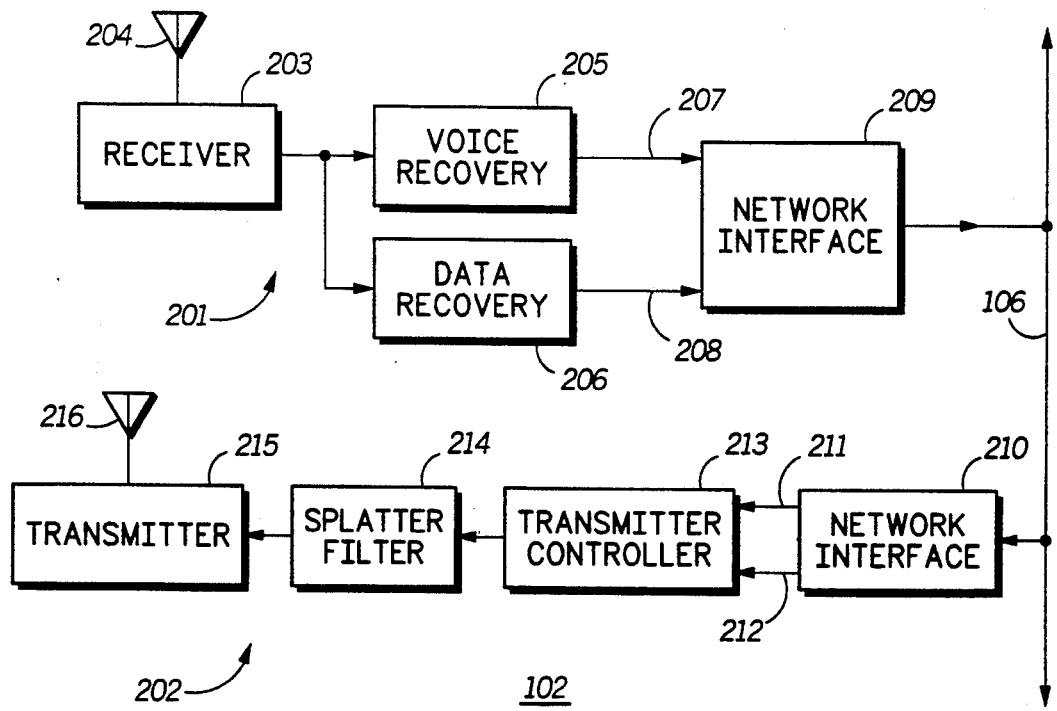
FIG. 2 is a block diagram of a repeater of FIG. 1.

Referring to FIG. 2, the repeater 102 is shown to include a receive and a transmit section (201 and 202 respectively). The receiver section 201 includes an RF receiver 203 that receives signals via an appropriate antenna structure 204 and that provides at its output a baseband signal. The baseband signal is passed to both a voice recovery block 205 and a data recovery block 206. The voice recovery block 205 processes the received baseband signal to recover a voice information signal 207. This signal might consist of the original audio signal when receiving an FDM communication, or in the case of a TDM communication, the voice signal 207 may be a processed version of the original audio signal (for example, voice processed via Sub-Band Coding or Linear Predictive Coding). Depending on the nature of the repeater interconnection network 106 and the type of communication (for example, an FDM communication (from unit 104) to a TDM unit (105), the voice recovery block 205 may include an audio encoder/decoder to reformat the received voice signal 207. In the case of the aforementioned audio processing, this coding function could be accomplished with a digital signal processor (DSP), for example the Motorola DSP56001.

The data recovery block operates in a known manner to recover any data information (such as, for instance, control slot information) included in the received signal, thus providing the received data signal 208. The recovered voice signal 207 and data signal 208 are passed to a repeater network interface 209, which communicates these signals to the central controller 101 or other repeaters 102 as is appropriate via the repeater interconnection network 106. So configured, the repeater 102 receives TDM/FDM RF signals and properly processes them to recover both voice and data information that may be present in the communication.

The transmitter section 202 also includes a network interface 210 that receives voice signals 211 and data signals 212. The voice signals 211 comprise received voice signals 207 from the repeater's receiver section 201 or from the receiver sections of other repeaters in the system. The data signals 212 include control channel information from the central controller 101. The voice signal 211 and data signal 212, are processed by a transmitter controller 213, to an appropriately modulated information signal at its output. As in the receiver section 201, the transmitter controller 213 may include a DSP to reformat the voice signal 211 as appropriate for various receiving communication units (such as, via Sub-Band Coding or Linear Predictive Coding). The output of the transmitter controller 213 is passed through a splatter filter 214 to an RF transmitter 215 that properly processes the signal to provide a signal that may be appropriately radiated from an antenna device 216 to cause transmission of the processed signal as desired.

Figure 3:
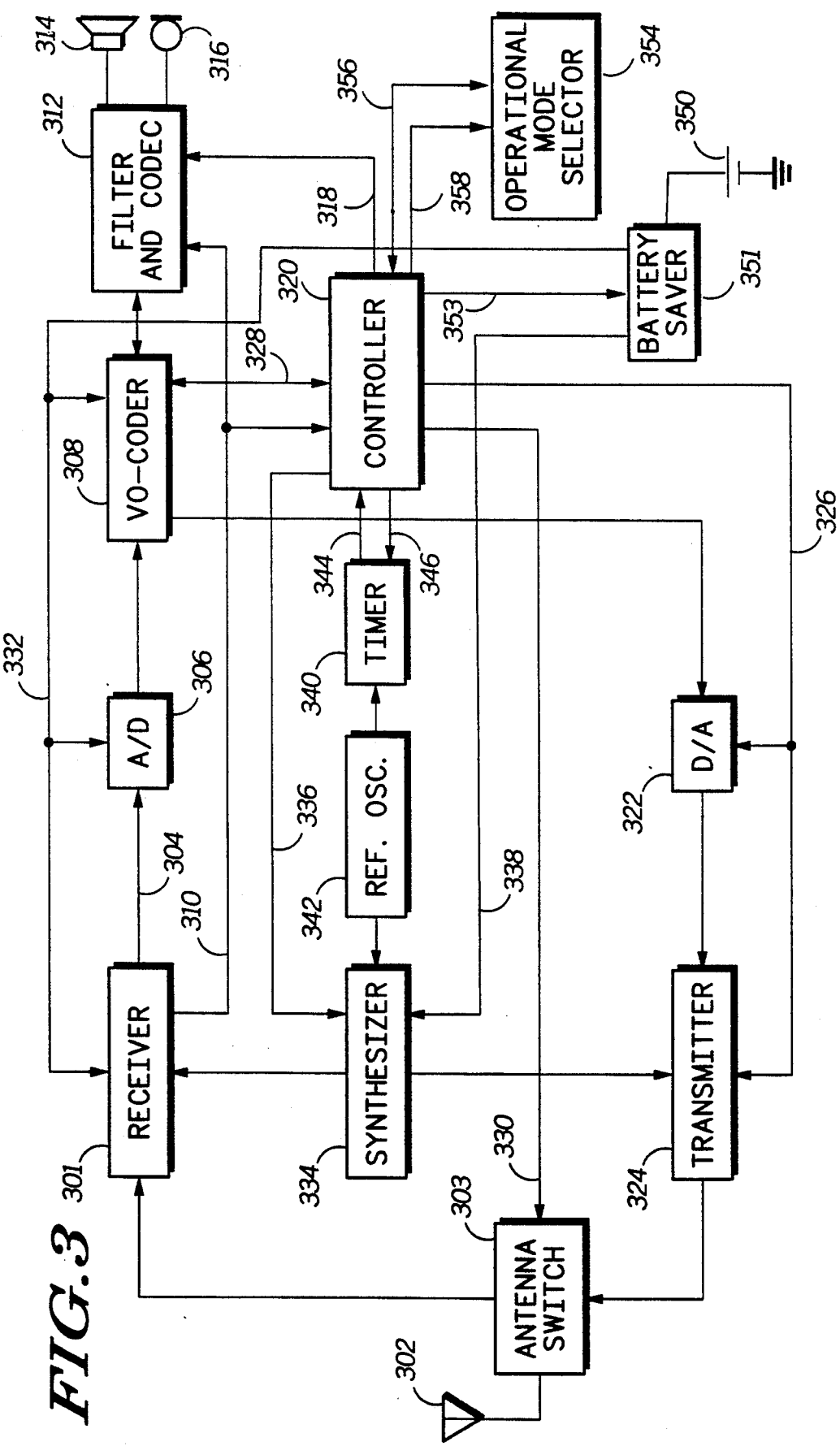
FIG. 3 is a block diagram of a battery powered communication device according to the invention.

Referring to FIG. 3, a communication unit is shown to include an RF receiver 301 that couples (via an antenna switch 303) to an appropriate antenna 302 to receive RF signals. The receiver 301 provides a synchronization signal 310, which provides the information required to establish frame and bit synchronization. The receiver 301 also provides a received baseband signal 304, which is digitized by an analog-to-digital (A/D) converter 306. The output of the A/D converter 306 is passed to a voice coder (vo-coder) 308 which may be embodied as, for example, a Motorola DSP56001. The vo-coder 308 provides the required coding/decoding function used in this embodiment to properly encode (or decode) the audio information in a particular form. In the preferred embodiment of the present invention, multi-level, digital sub-band coding comprises the preferred encode/decode format. The vo-coder 308 couples to a filter and Codec 312, which when activated (318) by a controller 320, routes decoded signals to an appropriate speaker 314 to be rendered audible. Audio signals to be transmitted are routed from a microphone 316 through the enabled (318) filter and Codec to the vo-coder 308 for processing. The processed audio information to be transmitted is passed from the vo-coder 308 to a digital-to-analog (D/A) convertor 322, to be appropriately converted before being applied to a transmitter 324. To conserve energy, both the transmitter 324 and the D/A 322 are deactivated (326) by the controller 320 unless the communication unit is transmitting. Of course, additional information appropriate to the TDM nature of the communications may be routed (328) to the vo-coder 308 by the controller 320 to be added prior to transmission. Ultimately, the properly coded and slot and frame synchronized information signal routed from the RF transceiver 324 to the antenna switch 303, which is controlled (330) by the controller 320 to selectively couple the transmitter 324 to the antenna 302 so that the signal that may be appropriately radiated to cause transmission of the processed signal as desired. Alternately, a duplexer could be used in place of the antenna switch 303 as is known in the art.

The controller 320 is the heart of the communication device and operates to control the many circuits comprising the communication device. In a portable embodiment of the communication device, a battery energy source 350 is coupled to a battery saver block 351 which under the control of the controller 320 provides power to each block of the communication unit. In order to conserve energy, the controller 320 periodically deactivates non-essential circuits by applying a control signal 353 to the battery saver circuit 351. In the preferred embodiment of the present invention, the battery saver circuit 351 deactivates the vocoder 308, the receiver 301 and A/D 306 via the control line 332; and a programmable (336) synthesizer 334 via control line 338. Of course, all of these circuits need not be activated for every embodiment, however, the preferred embodiment deactivates these circuits as they represent the most significant consumers of energy. Following circuit deactivation, the controller 320 triggers (346) a timer 340 and suspends (or greatly reduces the speed of) its own operation, which drastically reduces the current drawn by the controller. To recover from the energy saving state, a timer driven from a high stability (better than 10 ppm) reference oscillator 342 re-activates (344) the controller 320. After re-activation, the controller revives the temporarily deactivated circuits and operates to receive and decode at least a portion of the next control slot. The periodic deactivation/re-activation is precisely timed to insure that the communication unit re-activates immediately before a control slot so that signalling and control information may be received and acted upon. Deactivation may be retriggered after all or a portion of the control slots have been received. According to the invention, the communication unit may be made to function in one of two operational mode: a low power or energy saving mode and a high power or non energy saving mode. In the battery saving mode the communication device may be deactivated for a minimum of three quarters of a four slot TDM frame (less any wake-up time), awakening only to receive one of the two control slots used in the preferred embodiment of the present invention thereby keeping pace with system parameter changes, call assignments or other signalling or control messages.

When operating in the non-energy saving mode, the communication unit operates to receive both of the preferably two control slots. Compared to the energy saving mode, receiving both control slots enables the communication units to obtain system information twice as fast, thereby providing faster access to communication channels. In this way, the second operational mode improves the communication efficiency of the communication device. Of course, this "Fast Access" mode consumes more energy, and therefore, its use must be balanced against the operational life of the battery, and the communication unit itself. An operational mode selector 354 allows selection of the operational mode under which the communication unit functions by providing a control signal 356. Selecting the operational mode of the communication unit may be achieved by one of a number of methods. In its simplest form the communication unit user may activate a triggering mechanism, such as a switch, based upon which the controller determines which operational mode is selected. In another form the central controller 101 may instruct the communication unit under which mode to function. In this way, the central controller transmits proper control and signalling information during proper control slot. The control information will be decoded by the controller and supplied to the mode selector 354 (358) which determines which operational mode is desired. It may be appreciated that in this embodiment, the operational mode selector 354 may be included as a part of the controller 320. Other methods of selecting the operational mode may comprise hard coding the communication unit to operate in a one of the operational modes. In this way, a code may be stored within the communication unit and upon access by the controller 320 the appropriate operational mode is selected.

Figure 4:
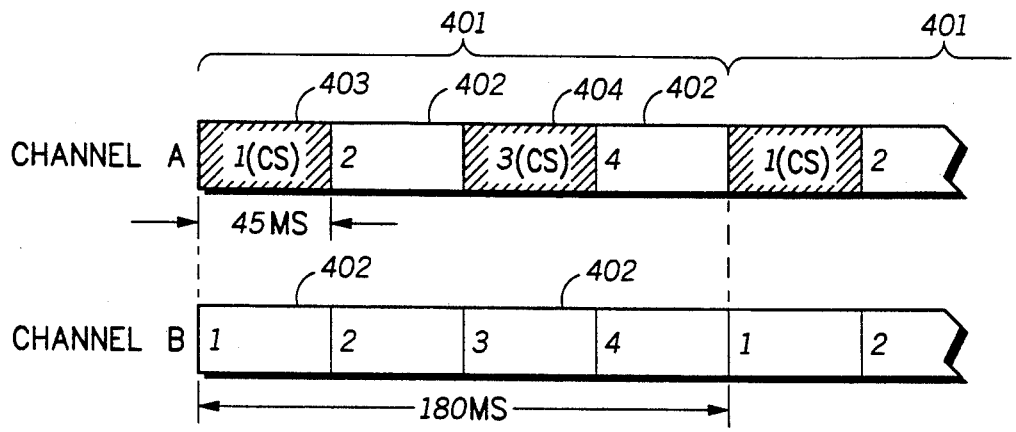
FIG. 4 is an illustration of an arrangement of communication channels and slot timing suitable for use with the present invention.

Referring to FIG. 4, the above described system functions in either a TDM or an FDM/TDM operating environment. While certain limited applications could effectively use a single channel, the remaining discussion will describe the more general case wherein at least two frequencies are available for the central 101 to assign for communication purposes, and where each of the frequencies are subdivided into frames and slots. In this particular embodiment, two channels A and B are depicted, each having frames 401 of 180 milliseconds, with four slots 402 per frame (each slot being 45 milliseconds). Each frame window 401 supports two non-contaguous control slots 403 and 404. In one embodiment, both control slots 403 and 404 may be on the same frequency. For example, channel A may support a control slot in slot 1 (403) and slot 3 (404) of each of its frames (401). In another embodiment, the control slots may be on different frequencies. For example, channel A could support a control slot in slot 1 and channel B could support a control slot in slot 3. Regardless of how the control slots are apportioned among the available channels there will always be at least two control slots for each frame window.

Figure 5:
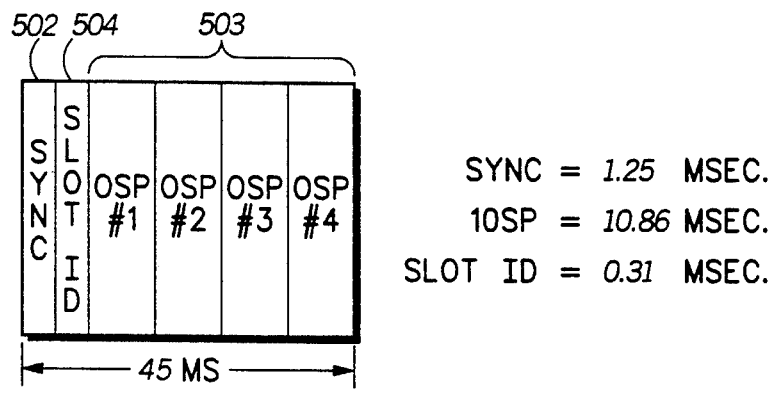
FIG. 5 is an illustration of an arrangement of outbound (i.e., central-to-communication units) information transmitted in a control slot of FIG. 4.

A control slot supports communication control information. FIG. 5 depicts the TDM outbound signalling information format (i.e., information sent by the central 101 to the communication units (104 and 105)) that may be provided in a control slot for this particular embodiment. In the 45 milliseconds provided for the slot, 1.25 milliseconds are used to provide 16 symbols that constitute a frame sync word 502 as is well understood in the art. Next, a 4 symbol slot identification (ID) code 504 is transmitted that identifies the slot's location within the frame. Following this, the preferred embodiment transmits four outbound signalling packets (OSPs) 503 each comprising 139 symbols (10.86 ms) representing 58 data symbols that are error encoded up to the 139 symbol limit. The 58 data symbols are allocated for a communication unit identification (ID) code, a call type code (i.e., individual or group call), symbols for frequency assignment information, and symbols that represent the assigned slot number. For example, one OSP could constitute a talk/request grant to a particular communication unit by identifying that communication unit by its ID, and identifying the assigned frequency and slot.

Figure 6:
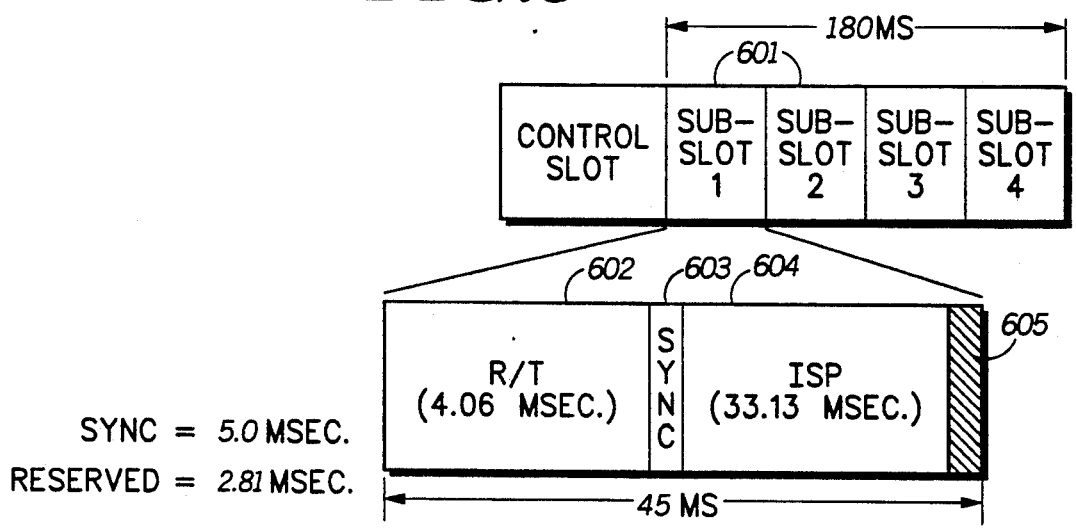
FIG. 6 is an illustration of an arrangement of inbound (i.e., communication unit-to-central) information transmitted in a control slot of FIG. 4.

With reference to FIG. 6, inbound signalling packets (ISPs) are also provided by the communication units (104 and 105) to the central 101 via the control slots. (If the channel that supports the control slot actually comprises paired frequencies (one for transmitting and one for receiving) as often occurs in trunked communications, then ISPs and OSPs can be supported in a side-by-side manner. If the channel comprises a single frequency only, then ISP and OSP service must be staggered to prevent contention). For ISPs, the 180 milliseconds of the control slot are subdivided into 4 subslots 601.

In an FDM inbound transmission (from subscriber 104), each subslot 601 includes a 4.06 millisecond 13 symbol dotting pattern 602 (to-allow-any transient effects known to occur in the transition from receive-to-transmit to settle) followed by 5 milliseconds of 16 symbol frame sync word information (603). 33.13 milliseconds are then allocated for 106 symbols of ISP information (604). These 106 symbols include 44 data symbols that are error encoded up to the 106 symbols. The 44 data symbols include symbols allocated for the communication unit ID and call type codes. Of course, some of the ID symbols or the call type request symbols can be allocated in the system to identify whether a requesting unit is a TDM/FDM communication unit 104 or a TDM only communication unit 105. Finally, 2.81 ms (nine symbol) are reserved (605) to account for propagation delay.

TDM inbound transmissions (from either subscriber 104 or 105) preferable employ the same communication format as illustrated in FIG. 6, however, the protocol differs in that the slot timing discussed above are divided by four (4).

So configured, a communication unit (104 or 105) can request frequency and slot assignments via the two control slots provided in each frame 401. The central can then identify the type of the requesting communication unit (104 or 105) and the type of the communication unit (104 or 105) with which the requesting unit desires to communicate. Further, the central 101 can assign a requesting unit an appropriate frequency and slot assignment, via the two control slots provide in each frame 401. In an alternate embodiment, the control slots, via special ISPs and OSPs, could also be used to transfer data packets between communications units (104).

When making frequency and slot assignments, the central 101 makes the assignment in a way that will assure that the assigned communication unit 104 will still be able to communicate on at least one of the control slots. For example, with respect to FIG. 4, a requesting unit could be assigned to transmit on slot 1 of channel B and to receive on slot 2 of channel A. This would allow the assigned communication unit (104) to continue to monitor control information in the control slot (404) that occupies the third time slot of channel A. In this way, important system control information can be provided with assurance to all TDM communication units (104), regardless of whether such communication units (104) are currently engaged in communications with other communication units or not.

Alternately, the central (101) could direct control information intended for the communication unit 104 previously assigned to slots 1 and 2 to only the control slot 404 known to be monitored by the communication unit 104. In yet another embodiment, communication units 104 may be of differing types with differing constraints as to how quickly a change in mode (receiving or transmitting) or a change in frequency could be accommodated. Accordingly, the central 101 would assign units so as to guarantee sufficient time to switch from participating in the assigned voice communication to monitoring the available control slot.

According to the invention, the use of two control slots provides an advantage in that two distinct operating modes may be balanced between increased operational life (for portable battery powered units) and increased operational performance. In an energy saving mode, non-essential circuits may be temporarily deactivated, being awakened to monitor one of the two control slots. This conserves energy, while maintaining the communication device operating within the flow of control information being transmitted in the control slots. In a second mode, fast access to communication channels may be had since the communication device may transmit and receive signalling and control information twice a rapidly as in the energy saver mode. In this way, operational performance may be balanced against operational lifetime.

What is claimed is:

1. In a battery powered device operating within a time division multiplexed communication system having a communication channel arranged into repetitive time frames which include a plurality of slots, wherein each frame include at least two control slots allocated for the communication of signalling and control information, wherein said signalling and control information include a slot identification code for identifying location of each control slot within the frame, a method for operating said battery powered device comprising the steps of:
   (a) monitoring a portion of only one of said at least two control slots and detecting the slot identification code of said control slot when operating in a first mode; and
   (b) monitoring a portion of each of said at least two control slots and detecting the slot identification codes of the at least two control slots when operating in a second mode.

2. The method of claim 1, wherein step (a) includes the step of:
   (a)(1) deactivating non-essential circuits in the battery powered device during each remaining control slot of said plurality of slots.

3. The method of claim 2, wherein step (a1) includes the step of: deactivating the non-essential circuits during any remaining portions of said only one control slot monitored in step (a).

4. The method of claim 2, which includes the step of (a2) reactivating said non-essential circuits prior to a succeeding frame having said slot monitored in step (a).

5. The method of claim 1, wherein step (b) includes the step of:
   (b1) deactivating non-essential circuits in the battery powered device during each remaining slot of said plurality of slots.

6. The method of claim 5, wherein step (b1) includes the step of: deactivating the non-essential circuits during any remaining portion of each of said at least two control slots monitored in step (b).

7. The method of claim 5, which includes the step of (b2) reactivating said non-essential circuits prior to a succeeding frame having said at least two slots monitored in step (b).

8. The method of claim 1, wherein step (a) comprises monitoring a portion of only a selected one of said at least two control slots when operating in said first mode.

9. The method of claim 1, wherein step (a) comprises monitoring a portion of only an assigned one of said at least two control slots when operating in said first mode.

10. The method of claim 1, wherein step (a) comprises monitoring a portion of only one of said at least two control slots, and at least one of said plurality of slots other than said at least two control slots when operating in said first mode.

11. The method of claim 1, wherein step (b) comprises monitoring a portion of each of said at least two control slots, and at least one of said plurality of slots other than said at least two control slots when operating in said second mode.

12. The method of claim 1, wherein step (a) comprises monitoring a portion of only one of said at least two control slots while operating on at least one of said plurality of slots other than said at least two slots when operating in said first mode.

13. The method of claim 1, wherein step (b) comprises monitoring a portion of each of said at least two control slots while operating on at least one of said plurality of slots other than said at least two control slots when operating in said second mode.

14. In a battery powered device operating within a time divisin multiplexed communication system having a communication channel arranged into repetitive time frames which include a plurality of slots, wherein each frame includes at least two control slots allocated for the communication of signalling and control information, wherein said signalling and control information include a slot identification code for identifying location of each control slot within the frame, a method for operating said battery powered device comprising the steps of:
   (a) monitoring a portion of only one of said at least two control slots and detecting the slot identification code of said control slot while deactivating non-essential circuits during each remaining slot when operating in a first mode;

(b) monitoring a portion of each of said at least two control slots and detecting the slot identification codes of the at least two control slots while inactivating non-essential circuits during each remaining slot when operating in a second mode; and, (c) adapting between said first mode and said second mode in response to a control signal.

15. A battery powered communication device being capable of conserving energy by functioning in one of two operational modes while operating within a time division multiplexed communication system having a communication channel arranged into repetitive time frames which include a plurality of slots, wherein each frame includes at least two control slots allocated for the communication of signalling and control information, wherein said signalling and control information include a slot identification code for identifying location of each control slot within the frame, said device comprising:

means for monitoring only a portion of one of said at least two control slots and detecting the slot identification code of said control slot when operating in a first mode; and means for monitoring a portion of each of said at least two control slots and detecting the slot identification codes of the at least two control slots when operating in a second mode.

16. The battery powered communication device of claim 15, wherein the first mode comprises a lower power mode or energy saving mode.

17. The battery powered communication device of claim 15, wherein the second mode comprises a higher power mode than the first mode.

18. The battery powered communication device of claim 15, which includes deactivation means for deactivating non-essential circuits during each remaining slot of the plurality of slots.

19. The battery powered communication device of claim 15, which includes reactivation means for reactivating any deactivated non-essential circuits prior to a succeeding frame having at least two slots allocated for the communication of signalling and control information.

20. The battery powered communication device of claim 15, wherein the particular one of the at least two slots monitored in the first mode is selectable by a mode selector means within the battery powered device.

21. The battery powered communication device of claim 15, wherein said means for monitoring a portion of each of said at least two control slots is responsive to said control and signalling information transmitted from said time division multiplexed communication system for assigning the particular one of the at least two slots monitored in the first mode.

22. The battery powered communication device of claim 15, which includes control means for controlling when the battery powered communication device operates in the first mode or the second mode in response to a control signal.

23. A battery powered communication device being capable of conserving energy by functioning in one of two operational modes while operating within a time division multiplexed communication system having a communication channel arranged into repetitive time frames which include a plurality of slots, wherein each frame includes at least two control slots allocated for the communication of signalling and control information, wherein said signalling and control information include a slot identification code for identifying location of each control slot within the frame, said device comprising:

receiving means for receiving information from one or more of the plurality of time slots;

means for monitoring only a portion of one of said at least two control slots and detecting the slot identification code of said control slot when operating in a low power or energy saving mode;

means for monitoring a portion of each of said at least two control slots and detecting the slot identification codes of the at least two control slots when operating in a higher power mode;

control means for controlling the battery powered communication device to operate in the energy saving mode or the higher power mode in response to a control signal.

24. In a battery powered device operating within a time division multiplexed communication system having a communication channel arranged into repetitive time frames which include a plurality of slots, wherein each frame includes at least two non-contiguous control slots allocated for the communication of signalling and control information, wherein said signalling and control information include a slot identification code for identifying location of each control slot within the frame, a method for operating said battery powered device comprising the steps of:

(a) monitoring a portion of only one of said at least two control slots and detecting the slot identification code of said control slot when operating in a first mode; and (b) monitoring a portion of each of said at least two control slots and detecting the slot identification codes of the at least two control slots when operating in a second mode.

* * * * *